(12) United States Patent
Bangalore

(10) Patent No.: US 8,812,972 B2
(45) Date of Patent: Aug. 19, 2014

(54) DYNAMIC GENERATION OF SOFT KEYBOARDS FOR MOBILE DEVICES

(75) Inventor: Srinivas Bangalore, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 422 days.

(21) Appl. No.: 12/570,096

(22) Filed: Sep. 30, 2009

(65) Prior Publication Data
US 2011/0078613 A1    Mar. 31, 2011

(51) Int. Cl.
| | | |
|---|---|---|
| G06F 3/048 | (2013.01) | |
| G06F 3/041 | (2006.01) | |
| G06F 3/14 | (2006.01) | |
| G06F 3/00 | (2006.01) | |
| G09G 5/00 | (2006.01) | |
| G06F 3/0488 | (2013.01) | |

(52) U.S. Cl.
CPC ................................. G06F 3/04886 (2013.01)
USPC ........... 715/773; 345/168; 345/169; 345/173; 715/788; 715/816; 715/825; 715/864; 715/866

(58) Field of Classification Search
USPC .......... 345/168, 169, 173; 715/773, 788, 816, 715/825, 864, 866
See application file for complete search history.

(56) References Cited

U.S. PATENT DOCUMENTS

| | | | | |
|---|---|---|---|---|
| 5,128,672 A | * | 7/1992 | Kaehler | 341/23 |
| 5,483,235 A | * | 1/1996 | Hanson et al. | 341/20 |
| 5,574,482 A | * | 11/1996 | Niemeier | 345/173 |
| 5,963,671 A | * | 10/1999 | Comerford et al. | 382/230 |
| 6,307,541 B1 | | 10/2001 | Ho et al. | |
| 6,573,844 B1 | * | 6/2003 | Venolia et al. | 341/22 |
| 6,614,422 B1 | | 9/2003 | Rafii | |
| 6,724,370 B2 | * | 4/2004 | Dutta et al. | 345/169 |
| 7,215,327 B2 | * | 5/2007 | Liu et al. | 345/168 |
| 7,376,938 B1 | * | 5/2008 | Van der Hoeven | 717/136 |
| 7,583,206 B2 | | 9/2009 | Volckers | |
| 2002/0035486 A1 | | 3/2002 | Huyn et al. | |
| 2002/0152203 A1 | * | 10/2002 | Ostergaard et al. | 707/3 |

(Continued)

FOREIGN PATENT DOCUMENTS

JP    2000330946    11/2000

OTHER PUBLICATIONS

U.S. Office Action dated Nov. 28, 2011 in U.S. Appl. No. 12/571,053.

(Continued)

*Primary Examiner* — Tadeese Hailu
*Assistant Examiner* — Eric J Bycer
(74) *Attorney, Agent, or Firm* — Hartman & Citrin LLC

(57) ABSTRACT

Devices and methods are disclosed which relate to improving the efficiency of text input by dynamically generating a visually assistive virtual keyboard. Exemplary variations display a soft keyboard on a touchscreen of a text-entry device. The touchscreen works with the soft keyboard as a form of text input. Keyboard logic on the text-entry device is programmed to change the visual appearance of each key within the soft keyboard based on the prior entry. The keyboard logic assigns a prediction value to each key based on a statistical probability that the key will be entered next. The touchscreen displays a visually enhanced keyboard based on these prediction values. Enhancements include resizing keys relative to their prediction value, rearranging the keys a distance from the previous key entered inverse to its prediction value, etc.

20 Claims, 5 Drawing Sheets

(56) References Cited

U.S. PATENT DOCUMENTS

| | | | |
|---|---|---|---|
| 2002/0171633 A1* | 11/2002 | Brinjes | 345/168 |
| 2003/0080945 A1* | 5/2003 | Betts-LaCroix | 345/168 |
| 2003/0095102 A1* | 5/2003 | Kraft et al. | 345/168 |
| 2004/0018857 A1* | 1/2004 | Asokan et al. | 455/564 |
| 2004/0052355 A1* | 3/2004 | Awada et al. | 379/355.01 |
| 2004/0095327 A1* | 5/2004 | Lo | 345/169 |
| 2004/0215726 A1* | 10/2004 | Arning et al. | 709/206 |
| 2005/0071778 A1* | 3/2005 | Tokkonen | 715/822 |
| 2005/0167251 A1 | 8/2005 | Sugimura et al. | |
| 2005/0188330 A1 | 8/2005 | Griffin | |
| 2005/0225540 A1 | 10/2005 | Kawakami et al. | |
| 2005/0253816 A1 | 11/2005 | Himberg et al. | |
| 2006/0009891 A1 | 1/2006 | Pawlak et al. | |
| 2006/0132446 A1 | 6/2006 | Soh et al. | |
| 2006/0168539 A1* | 7/2006 | Hawkins et al. | 715/780 |
| 2006/0256139 A1 | 11/2006 | Gikandi | |
| 2006/0279434 A1 | 12/2006 | Wang | |
| 2007/0016572 A1* | 1/2007 | Bates et al. | 707/5 |
| 2007/0046641 A1* | 3/2007 | Lim | 345/173 |
| 2007/0229476 A1* | 10/2007 | Huh | 345/173 |
| 2007/0288578 A1* | 12/2007 | Pantalone | 709/206 |
| 2008/0147639 A1* | 6/2008 | Hartman et al. | 707/5 |
| 2008/0174570 A1 | 7/2008 | Jobs et al. | |
| 2008/0281583 A1 | 11/2008 | Slothouber | |
| 2008/0309621 A1 | 12/2008 | Aggarwal et al. | |
| 2008/0313182 A1* | 12/2008 | Vasa | 707/6 |
| 2009/0010405 A1* | 1/2009 | Toebes | 379/93.23 |
| 2009/0040184 A9 | 2/2009 | Pu et al. | |
| 2009/0051661 A1 | 2/2009 | Kraft et al. | |
| 2009/0106695 A1 | 4/2009 | Perry et al. | |
| 2009/0150322 A1* | 6/2009 | Bower et al. | 706/50 |
| 2009/0189864 A1 | 7/2009 | Walker | |
| 2009/0195506 A1 | 8/2009 | Geidl | |
| 2009/0289958 A1 | 11/2009 | Kim et al. | |
| 2009/0319694 A1 | 12/2009 | Slezak et al. | |
| 2010/0008490 A1* | 1/2010 | Gharachorloo et al. | 379/216.01 |
| 2010/0026650 A1* | 2/2010 | Srivastava et al. | 345/173 |
| 2010/0036833 A1* | 2/2010 | Yeung et al. | 707/5 |
| 2010/0085313 A1 | 4/2010 | Rider | |
| 2010/0085317 A1 | 4/2010 | Park et al. | |
| 2010/0203874 A1* | 8/2010 | Scott et al. | 455/415 |
| 2010/0259561 A1 | 10/2010 | Forutanpour | |
| 2010/0265181 A1* | 10/2010 | Shore | 345/168 |
| 2011/0029862 A1* | 2/2011 | Scott et al. | 715/261 |
| 2012/0050169 A1 | 3/2012 | Ladouceur et al. | |
| 2012/0244914 A1 | 9/2012 | Lundy et al. | |

OTHER PUBLICATIONS

U.S. Office Action dated Jul. 9, 2012 in U.S. Appl. No. 12/571,053.
U.S. Office Action dated Nov. 21, 2012 in U.S. Appl. No. 12/571,053.
U.S. Office Action dated May 24, 2013 in U.S. Appl. No. 12/571,053.
U.S. Office Action dated Nov. 23, 2011 in U.S. Appl. No. 12/571,117.
U.S. Office Action dated Jul. 18, 2012 in U.S. Appl. No. 12/571,117.
U.S. Office Action dated Nov. 26, 2012 in U.S. Appl. No. 12/571,117.
U.S. Office Action dated May 24, 2013 in U.S. Appl. No. 12/571,117.
U.S. Office Action dated Sep. 25, 2013 in U.S. Appl. No. 12/571,053.
U.S. Office Action dated Sep. 25, 2013 in U.S. Appl. No. 12/571,117.
U.S. Office Action dated Dec. 23, 2011 in U.S. Appl. No. 12/571,157.
U.S. Office Action dated Aug. 16, 2012 in U.S. Appl. No. 12/571,157.
U.S. Office Action dated Mar. 14, 2013 in U.S. Appl. No. 12/571,157.
U.S. Office Action dated Dec. 22, 2011 in U.S. Appl. No. 12/571,192.
U.S. Office Action dated Nov. 20, 2012 in U.S. Appl. No. 12/571,192.
U.S. Office Action dated Jun. 19, 2013 in U.S. Appl. No. 12/571,192.
U.S. Office Action dated Dec. 2, 2011 in U.S. Appl. No. 12/571,239.
U.S. Office Action dated Jul. 19, 2012 in U.S. Appl. No. 12/571,239.
U.S. Office Action dated Nov. 21, 2012 in U.S. Appl. No. 12/571,239.
U.S. Office Action dated May 24, 2013 in U.S. Appl. No. 12/571,239.
U.S. Office Action dated Sep. 11, 2013 in U.S. Appl. No. 12/571,239.
U.S. Office Action mailed on Apr. 4, 2014 in U.S. Appl. No. 12/571,053.
U.S. Office Action mailed on Jun. 9, 2014 in U.S. Appl. No. 12/571,053.
U.S. Office Action mailed on May 7, 2014 in U.S. Appl. No. 12/571,117.
U.S. Office Action mailed on Apr. 9, 2014 in U.S. Appl. No. 12/571,239.
U.S. Office Action mailed on Jun. 6, 2014 in U.S. Appl. No. 12/571,239.
Hoggan et al., "Investigating the Effectiveness of Tactile Feedback for Mobile Touchscreens," Proc. Of SIGCHI Conf. On Human Factors in Computing Systems, pp. 1573-1582 (Apr. 2008).
Hoffmann et al., "TypeRight: A Keyboard with Tactile Error Prevention," Proc. Of the SIGCHI Conf. On Human Factors in Computing Systems, pp. 2265-2268 (Apr. 2009).

* cited by examiner

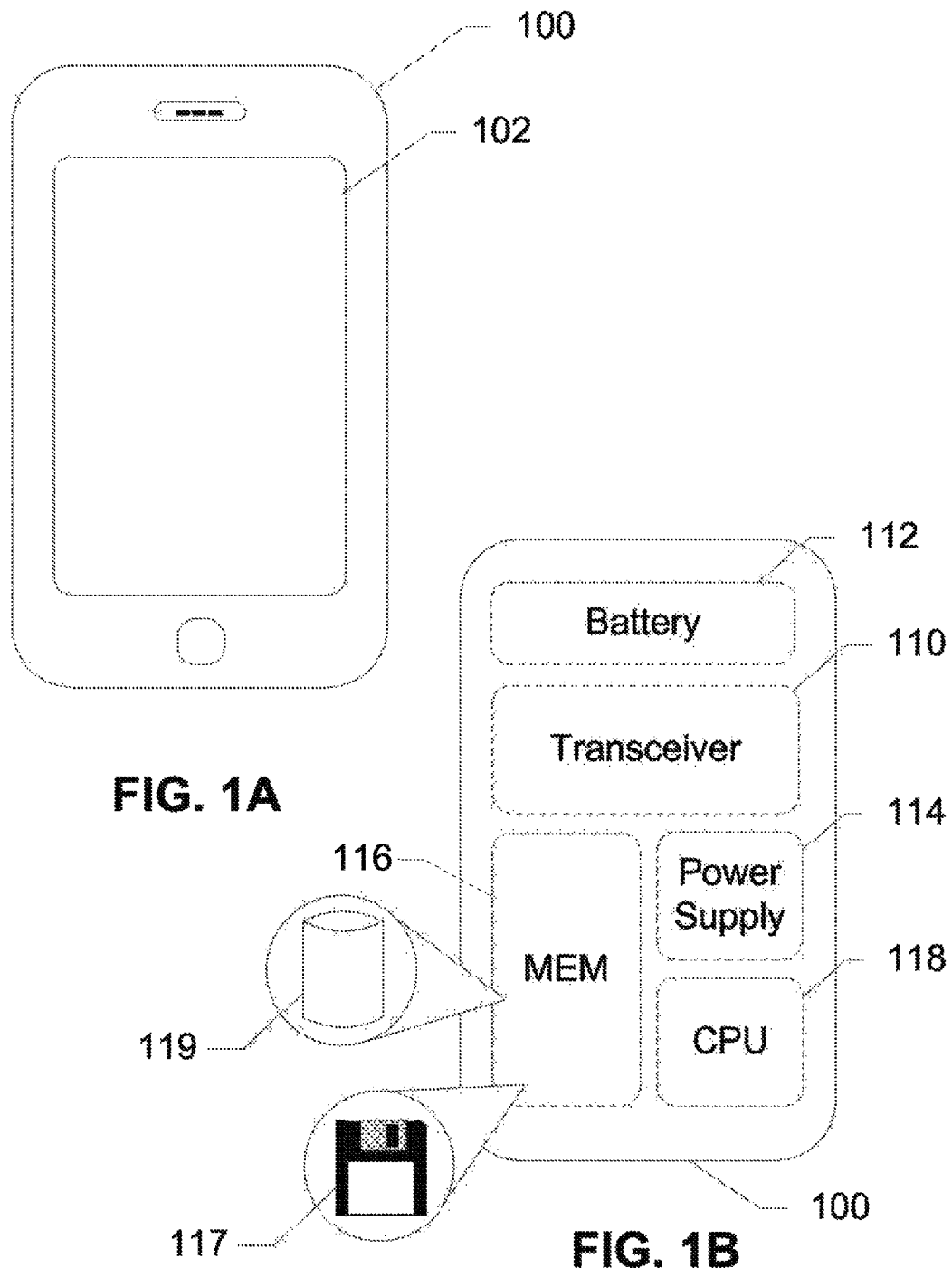

DYNAMIC GENERATION OF SOFT KEYBOARDS FOR MOBILE DEVICES

BACKGROUND OF THE INVENTION

1. Field of the Invention

The present invention relates to text-entry devices. More specifically, the present invention relates to dynamically generating a keyboard on a text-entry device.

2. Background of the Invention

With the pervasive use of mobile devices as both information access terminals and soon as computing terminals, the need for efficient methods of input will increasingly play a significant role. The current mobile devices are either endowed with a hard keyboard, such as a BLACKBERRY, or a soft keyboard, such as an IPHONE. The hard keyboard is usually associated with a multiple tap (triple tap) for a character input, while the soft keyboard allows for a visual display of all the alternatives.

The current text input methods on mobile devices are quite cumbersome. The hard keyboards as in BLACKBERRY devices require triple tap to input one character. This problem has been overcome to an extent with soft keyboards on IPHONES, but yet soft keyboards require a careful positioning of the finger on the character to prevent mistyping. This is particularly problematic for the elderly and visually handicapped users. These and many other users have the problem of striking multiple keys at once, often due to the relatively small size of the individual keys.

What is needed is an optimum utilization of space on a keyboard. This optimization may be different depending on what is being typed.

SUMMARY OF THE INVENTION

The present invention is a system and method for improving the efficiency of text input by dynamically generating a visually assistive soft keyboard. Exemplary embodiments of the present invention display a soft keyboard on a touchscreen of a text-entry device. The touchscreen works with the soft keyboard as a form of text input. Keyboard logic on the text-entry device is programmed to change the visual appearance of each key within the soft keyboard based on the prior entry. The keyboard logic assigns a prediction value to each key based on a statistical probability that the key will be entered next. The touchscreen displays a visually enhanced keyboard based on these prediction values. Enhancements include resizing keys relative to their prediction value, rearranging the keys a distance from the previous key entered inverse to its prediction value, etc. Other exemplary embodiments exploit the possible character sequences and their probabilities in a language and restructuring the keyboard to make text input more efficient. The present invention uses modeling techniques to dynamically generate the size of the characters on the keyboard. Further embodiments of the present invention dynamically generate virtual keyboards using equipment other than a touchscreen. In one embodiment of a virtual keyboard, the keyboard is projected optically on a flat surface and, as the user touches the image of a key, an optical device on the text-entry device detects the stroke. In another embodiment of a virtual keyboard, the keyboard is projected on an area and selected keys are transmitted as wireless signals. In each of these embodiments, the projected keys are dynamically generated, similar to those of the touchscreen keyboard.

In one exemplary embodiment, the present invention is a text-entry device for generating a visually assistive dynamic keyboard. The text-entry device includes a processor, a memory in communication with the processor, a touchscreen in communication with the processor, and a keyboard logic stored on the memory. The keyboard logic displays a dynamic keyboard having a plurality of keys substantially the same size on the touchscreen, assigns a prediction value to each key after a user enters a key, and visually assists the user in entering the next key by enhancing each key relative to the assigned prediction value.

In another exemplary embodiment, the present invention is a method of visually assisting a dynamic keyboard. The method includes displaying a dynamic keyboard having a plurality of keys substantially the same size on the touchscreen, assigning a prediction value to each key after each key entry, and visually assisting the user in entering the next key by enhancing each key relative to the assigned prediction value. The dynamic keyboard is displayed on the touchscreen of a text-entry device.

In yet another exemplary embodiment, the present invention is a text-entry device for generating a visually assistive dynamic keyboard. The text-entry device includes a processor, a memory in communication with the processor, a display in communication with the processor, a laser keyboard system in communication with the processor, and a keyboard logic stored on the memory. The keyboard logic displays a dynamic keyboard having a plurality of keys substantially the same size on a surface, assigns a prediction value to each key after a user enters a key, and visually assists the user in entering the next key by enhancing each key relative to the assigned prediction value.

BRIEF DESCRIPTION OF THE DRAWINGS

FIGS. 1A and 1B show a text-entry device 100 for generating a dynamic keyboard, according to an exemplary embodiment of the present invention.

DETAILED DESCRIPTION OF THE INVENTION

Figure 2A:
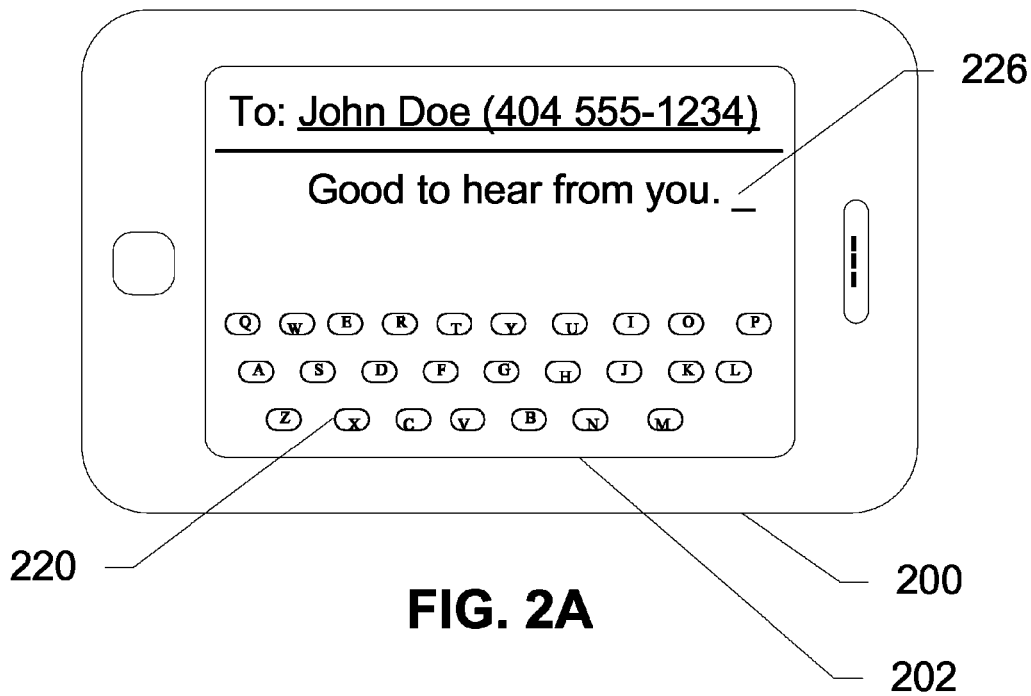
FIG. 2A shows a dynamic keyboard 220 on a touchscreen 202 of a text-entry device 200 where a user is beginning a new sentence, according to an exemplary embodiment of the present invention.

The present invention provides for systems and methods for improving the efficiency of text input by dynamically generating a visually assistive soft keyboard. Exemplary embodiments of the present invention display a soft keyboard on a touchscreen of a text-entry device. The touchscreen works with the soft keyboard as a form of text input. Keyboard logic on the text-entry device is programmed to change the visual appearance of each key within the soft keyboard based on the prior entry. The keyboard logic assigns a prediction value to each key based on a statistical probability that the key will be entered next. The touchscreen displays a visually enhanced keyboard based on these prediction values. Enhancements include resizing keys relative to their prediction value, rearranging the keys a distance from the previous key entered inverse to its prediction value, etc. Other exemplary embodiments exploit the possible character sequences and their probabilities in a language and restructuring the keyboard to make text input more efficient. The present invention uses modeling techniques to dynamically generate the size of the characters on the keyboard.

Further embodiments of the present invention dynamically generate virtual keyboards using equipment other than a touchscreen. In one embodiment of a virtual keyboard, the keyboard is projected optically on a flat surface and, as the user touches the image of a key, an optical device on the text-entry device detects the stroke.

In another embodiment of a virtual keyboard, the keyboard is projected on an area and selected keys are transmitted as wireless signals. In each of these embodiments, the projected keys are dynamically generated, similar to those of the touchscreen keyboard. Other embodiments change the color of each key so that likely keys are more visible. The colors may use any range, brightness, or depth that the touchscreen is capable of producing. For a touchscreen this is usually 16-bit, or about 64,000 colors, to 32-bit color, or about 4 billion colors. Users choose the color scheme or range of colors to use and can adjust the range to their preference. For instance some users will prefer the color blue to red. Keys likely to be entered next will appear blue and keys unlikely to be entered next will appear red. A user can also make adjustments so that the blue keys appear bright blue and the red keys appear a dim red.

A common problem with the soft keyboards or virtual keyboards is that the space on the touchscreen is not optimally utilized. The space can be more efficiently utilized by a dynamically generated keyboard layout. This is because not all characters, or keys, are equally likely to be entered when considering a user having already provided an input, i.e. the first two letters of a word, etc. In English, the likelihood for a 'U' to follow 'Q' is very high considering a 'U' follows 'Q' in most every instance. Other keys may follow 'Q' such as when typing a serial number or otherwise encoded string of characters, but 'U' is by far the most likely. Such information is collected from a large corpus of English sentences using a character-based language model that computes the statistical probability of one character following another character. This language model probability is used to display the keyboard with the size of each key proportional to the probability of the character following the input provided thus far. Thus, the size of the 'U' key would be very large if the preceding character were a 'Q', reflecting the probability of 'U' following 'Q' to be very high. The method of computing:

$$P(next\_char | previous\_char)$$

is well known in the art.

Given a corpus of a language (say English), exemplary embodiments of the invention break down the words into a sequence of characters. Using these sequences of characters, the probability of a particular letter following a character is calculated. Using the above example, the probability of 'U' following 'Q' is very high in the English language since 'Q' is almost always followed by 'U'. This notion can be extended to larger contexts as well, such as the probability of an 'E' entered after the three characters 'S' 'T', and 'E'. The mathematical expression of the probability can be represented as the following:

$$P(e | ste)$$

These probabilities can be used to modify many facets of the soft keyboard. For example, the probabilities can be used to determine the position of the most likely keys so as to appear at locations where the user's finger is most likely to be; or the size of the keys to be proportional to their probabilities; or the color of the keys to be a reflection of the likelihood of that character following the character string typed in thus far.

A similar approach can be adopted at the word level with a word-based prediction model for longer texts, such as e-mails. The expectation of this approach of dynamically generating the keyboard is that it would lead to efficient text input. This would also alleviate the problem of elderly trying to find small keys on a mobile phone and will improve the accessibility of these devices to a larger population of users.

"Text-entry device," as used herein and throughout this disclosure, refers to an electronic device which accepts an alphanumeric input often supplied by a virtual or physical keyboard. Examples of a text-entry device include notebook computers, tablet computers, personal digital assistants (PDAs), cellular telephones, smart phones, etc.

"Touchscreen," as used herein and throughout this disclosure, refers to a display that can detect and locate a touch on its surface. Examples of types of touchscreen include resistive, which can detect many objects; capacitive, which can detect multiple touches at once; etc.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B show a text-entry device 100 for generating a dynamic keyboard, according to an exemplary embodiment of the present invention. In this embodiment, text-entry device 100 includes a touchscreen 102, a transceiver 110, a battery 112, a power supply 114, a central processing unit (CPU) 118, and a memory 116. Touchscreen 102 is an LCD or LED screen that is touch-sensitive such that a user can make selections or otherwise perform input on touchscreen 102. This allows the user to type letters, numbers, and symbols in order to create text messages, e-mails, etc. Touchscreen 102 displays a dynamic keyboard according to commands sent from CPU 118. Transceiver 110 allows text-entry device 100 to wirelessly communicate with a network, other wireless devices, etc. Transceiver 110 may use cellular radio frequency technology (RF), BLUETOOTH, WiFi, etc. Battery 112 stores an electric charge to power components of text-entry device 100. Power supply 114 transforms power from battery 112 to provide power to each of the components of text-entry device 100. CPU 118 commands components of text-entry device 100 according to logic on memory 116. Memory 116 stores logic, data, etc. Among the items stored on memory 116 is a keyboard logic 117, and a language database 119. Keyboard logic 117 displays a dynamic keyboard having a plurality of keys substantially the same size on the touchscreen 102, assigns a prediction value to each key after a user enters a key, and visually assists the user in entering the next key by enhancing each key relative to the assigned prediction value. Keyboard logic 117 references language database 119 when assigning prediction values. Language database 119 contains, among other things, a dictionary, statistical data, etc. For instance, when the user is typing an e-mail, keyboard logic 117 considers the prior entry and, based on this, predicts the next key entry that is necessary to complete a word being typed. Keyboard logic 117 does this for each key on the dynamic keyboard. Keyboard logic 117 instructs CPU 118 to command touchscreen 102 to display the dynamic keyboard according to a visually assistive enhancement. In one embodiment of the visually assistive enhancement, keyboard logic 117 looks to the top five keys in terms of prediction value. The keys with the most prediction value are displayed larger than other keys of the dynamic keyboard on touchscreen 102.

There are many other embodiments of a text-entry device that uses a visually assistive dynamic keyboard. The embodiment in FIGS. 1A and 1B is similar to that of a cellular telephone or smart phone. Another exemplary embodiment is a PDA having a visually assistive dynamic keyboard. The feel is similar to that of FIGS. 1A and 1B since the size of the touchscreen is comparable. Most users will find typing easiest using their thumbs. However, other embodiments accommodate users for finger typing. Another exemplary embodiment features a tablet computer with a visually assistive dynamic keyboard. A tablet computer typically has a much larger touchscreen than your average PDA and can accommodate a full size soft keyboard. The keyboard logic 117 can make this typing experience just as easy by generating a visually assistive dynamic keyboard. Also, a soft numeric keypad such as that generated on the touchscreen 102 of a cellular telephone utilizes a visually assistive dynamic keypad. When typing text, the keyboard logic 117 visually enhances the numeric keys based on the prediction values of the associated characters similar to that of a QWERTY keyboard. When dialing telephone numbers, the keyboard logic 117 references a contacts list on the cellular telephone and calculates prediction values based on statistical patterns from the contacts list.

FIGS. 2A-2D show changes to a dynamic keyboard at different points in a word or sentence, according to exemplary embodiments of the present invention. These figures show examples of how keys on the keyboard are visually enhanced due to their likelihood of being the next key entry, or their prediction value. These embodiments resize or exchange the keys to make the predicted keys easier to find or enter.

FIG. 2A shows a dynamic keyboard 220 on a touchscreen 202 of a text-entry device 200 where a user is beginning a new sentence, according to an exemplary embodiment of the present invention. In this embodiment, the user has just completed a sentence, as signified by a period at the end of the sentence, and the user is about to begin a new sentence at entry space 226. At this point, each of the keys corresponding to letters or numbers is the same size or a normal size for the virtual keyboard. For instance, the 'E' key 224 is the same size as every other key on the keyboard at this point.

As the user begins typing a word, logic on the device predicts what the next key the user intends to enter will be. For instance, FIG. 2B shows a change in size of predicted keys when a user has entered 'WH'.

Figure 2B:
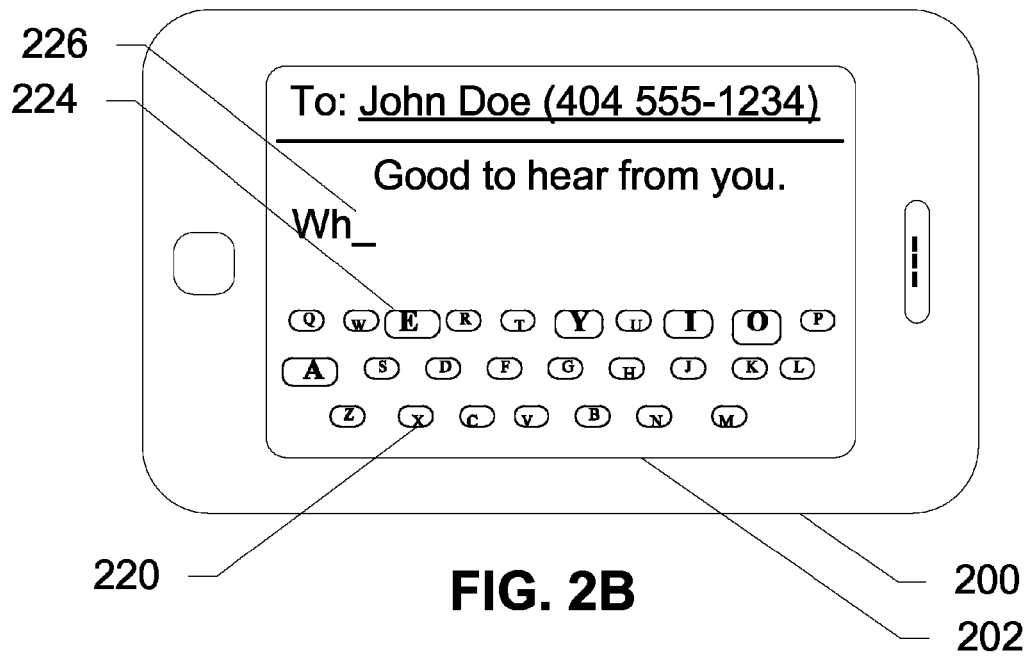
FIG. 2B shows a dynamic keyboard 220 on a touchscreen 202 of a text-entry device 200 where predicted keys are enlarged, according to an exemplary embodiment of the present invention.

FIG. 2B shows a dynamic keyboard 220 on a touchscreen 202 of a text-entry device 200 where predicted keys are enlarged, according to an exemplary embodiment of the present invention. In this embodiment, the user has already begun entering a word of a new sentence. The user has entered 'Wh' and entry space 226 is directly following the two letters. A keyboard logic on text-entry device then assigns a prediction value to each letter representing the likelihood the letter will occupy entry space 226 based upon the previously entered letters of the word, "Wh" in this case. The keys for the most probable letters are then enlarged on the keyboard such that when typing, the user can find and hit these keys more easily. Also because these letters are now larger, the chance of accidentally hitting the wrong key is decreased. In the example shown, 'E' key 224 is one of the more likely keys to be entered after the 'Wh' has been entered and thus is now larger than the majority of other keys. The "X" key, which is unlikely to be the next key, remains the same size as in FIG. 2A. Other characters have been enlarged as well such as "Y", "I", "O", and "A". Since vowels are more commonly used in the English language, the keys representing vowels routinely become enlarged. The number of enlarged keys and the degree to which the keys are enlarged may be set by the user, device, etc.

Other visually assistive enhancements are shown in the following figures of a text-entry device.

Figure 2C:
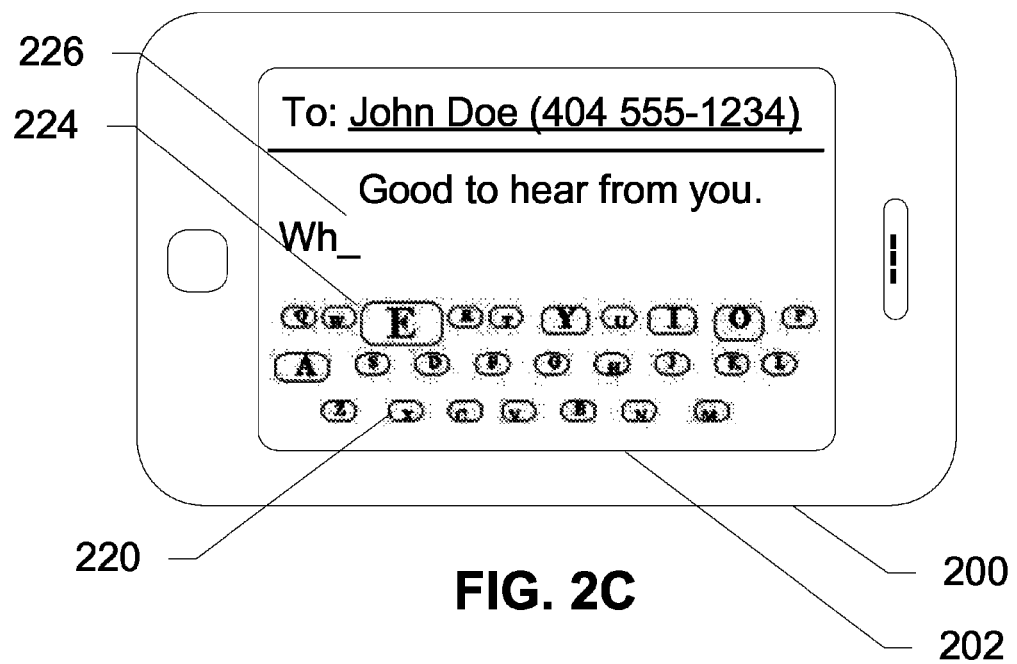
FIG. 2C shows a dynamic keyboard 220 on a touchscreen 202 of a text-entry device 200 where certain predicted keys are enlarged more than others, according to an exemplary embodiment of the present invention.

FIG. 2C shows a dynamic keyboard 220 on a touchscreen 202 of a text-entry device 200 where certain predicted keys are enlarged more than others, according to an exemplary embodiment of the present invention. In this embodiment, the user has again already begun entering a word of a new sentence. The user has entered 'Wh' and entry space 226 is directly following these two letters. A keyboard logic on text-entry device 200 then predicts what the next letter will be in entry space 226 based upon the entered letters of the word. The most probable letters are again enlarged as in FIG. 2B. However, these keys are enlarged proportional to the extent of their probability, or to their prediction value. For example, because 'E' key 224 has a very high probability of being the next key entered to complete the sentence, 'E' key 224 is now very large in comparison to the majority of keys. 'E' key 224 is also larger than, for instance, the 'O' key, as 'E' key 224 is more likely than the 'O' key to be the next key entered.

There exist many ways of resizing the keys to assist a user in typing. The foregoing embodiments focus on enlarging the keys having higher prediction values. Other embodiments shrink keys of characters having lower prediction values as well. Further embodiments utilize a combination of enlarging the keys of characters having higher prediction values and at the same time shrinking the keys of characters having a lower prediction value. For some of these embodiments the layout becomes complicated when trying to avoid overlapping keys. Some embodiments having more complex dynamic keyboard calculations have logic to displace as well as resize the keys. While some keys shrink and some keys enlarge, the smaller keys can be displaced to make room for the larger keys. Larger keys can also be displaced to make room for adjacent or nearby larger keys. At the same time the keyboard logic determines the optimal sizing scheme to ensure a desired amount of touchscreen space is used when displaying a visually assistive dynamic keyboard of these embodiments.

Figure 2D:
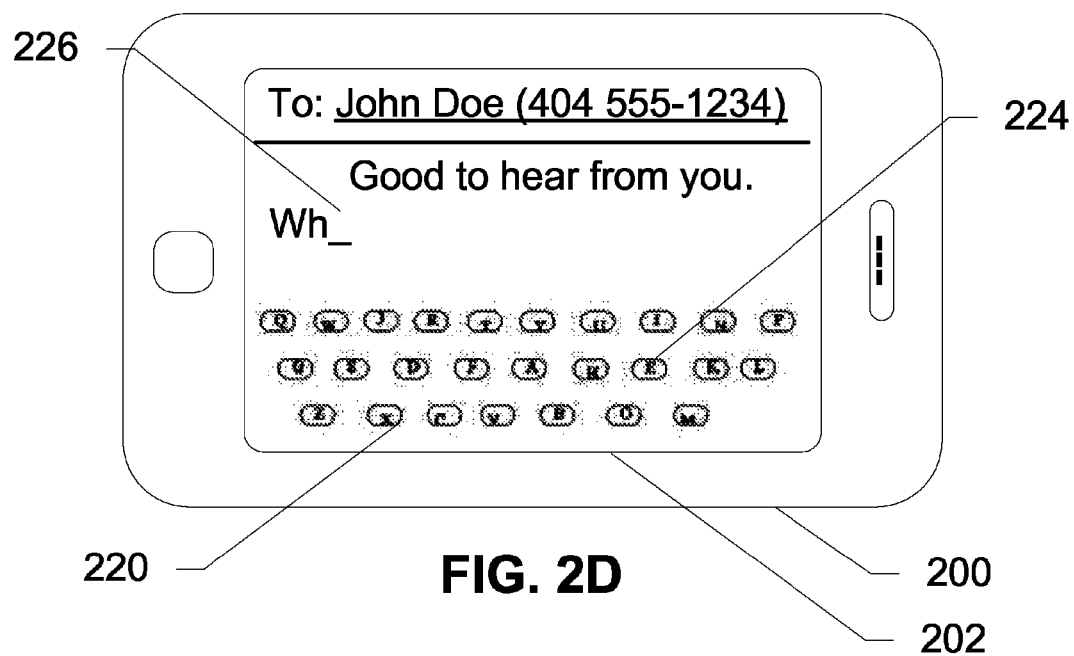
FIG. 2D shows a dynamic keyboard 220 on a touchscreen 202 of a text-entry device 200 where certain predicted keys are placed around the previous key struck, according to an exemplary embodiment of the present invention.

FIG. 2D shows a dynamic keyboard 220 on a touchscreen 202 of a text-entry device 200 where certain predicted keys are placed around the previous key struck, according to an exemplary embodiment of the present invention. In this embodiment, the user has already begun entering a word of a new sentence. The user has entered 'Wh' and entry space 226 is directly following the two letters. A keyboard logic on text-entry device 200 then predicts what the next letter will be in entry space 226 based upon the entered letters of the word. The keys of the most probable letters are placed adjacent to the previous letter struck. For instance, in this example, the most probable keys are placed around the 'H' button which was just struck. Thus, 'E' key 224 has been moved and is now adjacent to 'H' key. 'X' key remains in the same place or may be moved further away, depending upon the prediction value assigned to the 'X' key.

In the foregoing exemplary embodiment only characters associated with the top five prediction values have been exchanged with characters nearby the last key entered. In other embodiments more keys can be rearranged so that the distance of every key on the keyboard from the last key entered reflects a prediction value for that character.

Figure 3:
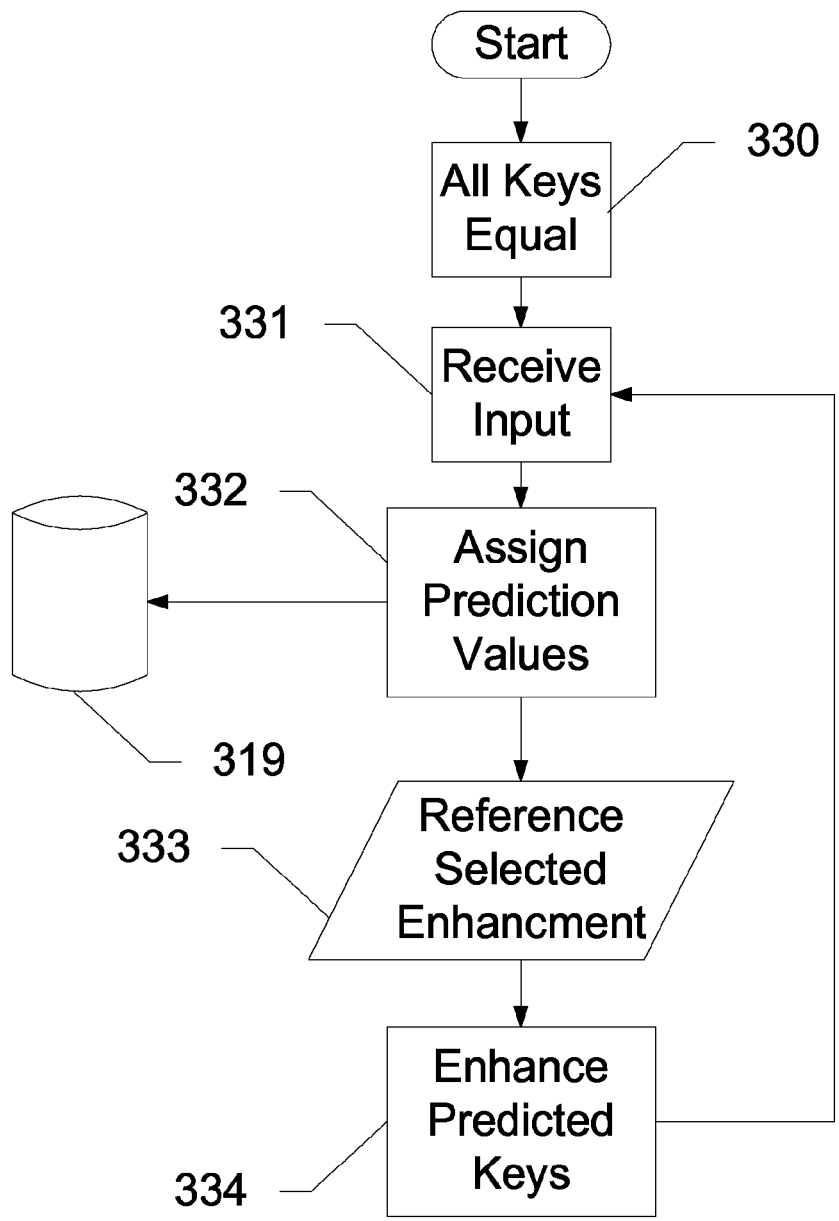
FIG. 3 shows a flowchart of a method of dynamically visually enhancing a keyboard of a text-entry device, according to an exemplary embodiment of the present invention.

FIG. 3 shows a flowchart of a method of dynamically visually enhancing a keyboard of a text-entry device, according to an exemplary embodiment of the present invention. In this embodiment, when the user begins entering text into an e-mail, text message, or other writing, all of the keys of the dynamic keypad are the same size and are in a QWERTY arrangement 330. The dynamic keyboard receives an input 331 from, for example, a key entry. With an input received, keyboard logic on the text-entry device assigns prediction values to each of the keys on the keyboard 332. This is accomplished by referencing language database 319. This prediction value is the chance that a given character with corresponding key is the character that will be entered by the user to complete a word or sentence. With the prediction values assigned, the keyboard logic determines a selected enhancement to the keyboard 333. The database informs the keyboard logic which keys should be enlarged, and how much, based upon the prediction values. The keyboard logic then instructs a processor to command a touchscreen to enhance the predicted keys 334.

Figure 4:
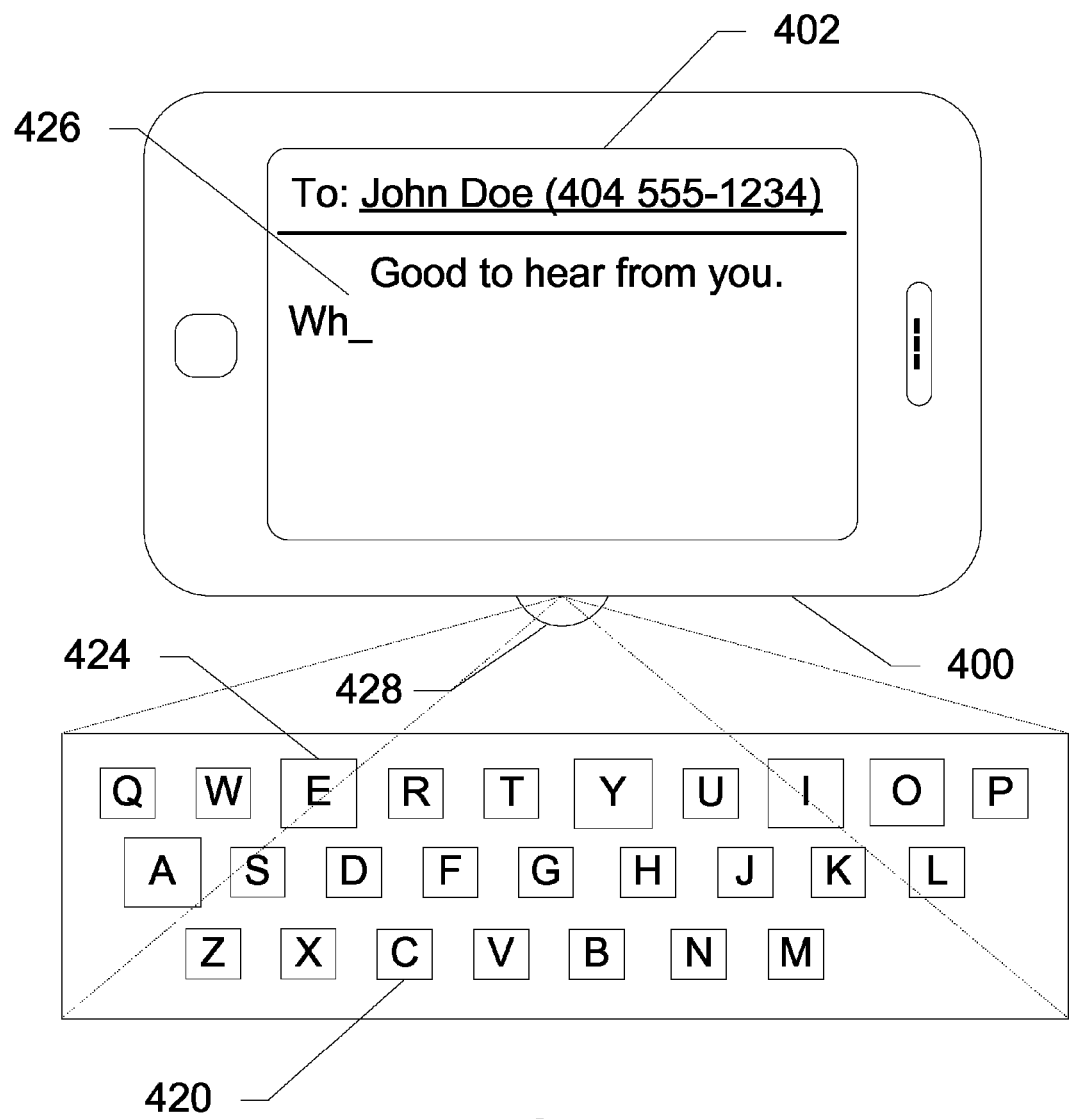
FIG. 4 shows a text-entry device with a virtual keyboard, according to an exemplary embodiment of the present invention.

FIG. 4 shows a text-entry device 400 with a virtual keyboard 420, according to an exemplary embodiment of the present invention. In this embodiment, text-entry device 400 includes a laser keyboard system 428. Laser keyboard system includes a laser projector which projects virtual keyboard 420 onto a surface, and a three-dimensional image sensor system which detects when virtual keys are entered. Laser keyboard system 428 projects an image of each of the keys of the keyboard 420 onto any type of surface, but preferably a flat surface. Similar to other embodiments, when the user begins typing, a keyboard logic determines what the probable next key the user intends to select will be. The most probable next keys are enlarged such that they are easier to see and press. For example, in FIG. 4, the user has already typed 'WH' onto a display 402 of text-entry device 400 using keyboard 420. The keyboard logic determines that the probable next letters include 'A', 'E', 'Y', 'I', and 'O'. Thus, the key of each of these letters is enlarged on virtual keyboard 420. For instance, 'E' key 424 has been enlarged and is now easier to find and press. Laser keyboard system 428 projects the image of virtual keyboard 420 with these probable keys enlarged. When the user presses a key, laser keyboard system 428 detects this press and registers the press with a processor which causes the letter or number corresponding to the key to appear on display 402.

Alternatively, the optical laser is part of a separate device that communicates with the text-entry device through a wired or wireless communication. For instance, this device may communicate with the text-entry device through BLUETOOTH.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
   a touchscreen;
   a processor; and
   a memory that stores computer-executable instructions that, when executed by the processor, cause the processor to perform operations comprising
      displaying, on the touchscreen, a dynamic keyboard having a plurality of numerical keys substantially the same size,
      detecting input corresponding to entry of a key on the dynamic keyboard, wherein the input detected comprises entry of a first numerical key corresponding to a first digit in a telephone number,
      assigning, based upon the key a plurality of prediction values to the plurality of numerical keys in response to detecting the input, wherein each of the plurality of prediction values is based upon a statistical pattern from a contact list, wherein the contact list comprises an entry comprising the telephone number, and wherein the plurality of prediction values comprise probabilities that a corresponding numerical key of the plurality of numerical keys will be a numerical key selected next, and wherein the corresponding numerical key corresponds to a next digit in the telephone number, and
      visually enhancing the dynamic keyboard based upon the plurality of prediction values, wherein visually enhancing the dynamic keyboard comprises altering an appearance of the dynamic keyboard based upon the plurality of prediction values and displaying a visually enhanced dynamic keyboard, wherein altering the appearance of the dynamic keyboard comprises
         shrinking a second numerical key of the plurality of numerical keys based upon a first corresponding prediction value,
         enlarging a third numerical key of the plurality of numerical keys based upon a second corresponding prediction value,
         changing a color of fourth numerical key of the plurality of numerical keys based upon a third corresponding prediction value, and
         changing a distance between the first numerical key and a fifth numerical key of the plurality of numerical keys based upon an inverse of a fourth corresponding prediction value.

2. The device in claim 1, wherein altering the appearance of the dynamic keyboard comprises resizing each of the plurality of numerical keys in proportion to the plurality of prediction values.

3. The device in claim 1, wherein altering the appearance of the dynamic keyboard comprises changing distances between each of the plurality of numerical keys and the key associated with the input detected.

4. The device in claim 1, wherein altering the appearance of the dynamic keyboard comprises changing a color of each of the plurality of numerical keys based upon the plurality of prediction values.

5. The device in claim 1, further comprising a transceiver.

6. The device of claim 1, wherein altering the appearance of the dynamic keyboard comprises exchanging a fifth of the plurality of numerical keys with a sixth of the plurality of numerical keys based upon a fifth corresponding prediction value.

7. The device of claim 1, wherein displaying the visually enhanced dynamic keyboard comprises displaying the visually enhanced dynamic keyboard on the touchscreen.

8. The device of claim 1, wherein displaying the visually enhanced dynamic keyboard comprises projecting the visually enhanced dynamic keyboard using an optical laser of a device that communicates with the device via wireless signals.

9. A method comprising;
displaying, at a device comprising a touchscreen and a processor executing a keyboard logic, a dynamic keyboard having a plurality of numerical keys appearing to have substantially the same size on the touchscreen;
detecting, by the processor, input corresponding to entry of a key on the dynamic keyboard, wherein the input detected comprises entry of a first numerical key corresponding to a first digit in a telephone number;
assigning, by the processor and based upon the key entered, a plurality of prediction values to the plurality of numerical keys in response to detecting the input, wherein each of the plurality of prediction values is based upon a statistical pattern from a contact list, wherein the contact list comprises an entry comprising the telephone number, and wherein the plurality of prediction values comprise probabilities that a corresponding numerical key of the plurality of numerical keys is to be a next key selected, and wherein the corresponding numerical key corresponds to a next digit in the telephone number; and
visually enhancing, by the processor, the dynamic keyboard based upon the plurality of prediction values, wherein visually enhancing the dynamic keyboard comprises altering an appearance of the dynamic keyboard based upon the plurality of prediction values and displaying a visually enhanced dynamic keyboard, wherein altering the appearance of the dynamic keyboard comprises
shrinking a second numerical key of the plurality of numerical keys based upon a first corresponding prediction value,
enlarging a third numerical key of the plurality of numerical keys based upon a second corresponding prediction value,
changing a color of fourth numerical key of the plurality of numerical keys based upon a third corresponding prediction value, and
changing a distance between the first numerical key and a fifth numerical key of the plurality of numerical keys based upon an inverse of a fourth corresponding prediction value.

10. The method of claim 9, wherein altering the appearance of the dynamic keyboard comprises resizing each of the plurality of numerical keys in proportion to the plurality of prediction values.

11. The method of claim 9, wherein altering the appearance of the dynamic keyboard comprises changing distances between each of the plurality of numerical keys and the numerical key associated with the input detected.

12. The method of claim 9, wherein altering the appearance of the dynamic keyboard comprises changing a color of each of the plurality of numerical keys based upon the plurality of prediction values.

13. The method of claim 9, further comprising resetting the dynamic keyboard so that none of the plurality of numerical keys is visually enhanced.

14. The method of claim 9, wherein altering the appearance of the dynamic keyboard comprises exchanging a fifth of the plurality of numerical keys with a sixth of the plurality of numerical keys based upon a fifth corresponding prediction value.

15. The method of claim 9, wherein displaying the visually enhanced dynamic keyboard comprises displaying the visually enhanced dynamic keyboard on the touchscreen.

16. The method of claim 9, wherein displaying the visually enhanced dynamic keyboard comprises projecting the visually enhanced dynamic keyboard using an optical laser of a device that communicates with the device via wireless signals.

17. A device comprising:
a laser keyboard system;
a processor; and
a memory that stores computer executable instructions that, when executed by the processor, cause the processor to perform operations comprising
displaying, by the laser keyboard system and on a surface, a dynamic keyboard comprising a plurality of numerical keys appearing to have substantially the same size, substantially the same color, and substantially the same distance between each of the plurality of numerical keys,
detecting input corresponding to entry of a key of the dynamic keyboard via interaction with the dynamic keyboard on the surface, wherein the input detected comprises entry of a first numerical key corresponding to a first digit in a telephone number,
assigning, based upon the key entered a plurality of prediction values to the plurality of keys in response to detecting the input, wherein each of the plurality of prediction values is based upon a statistical pattern from a contact list, wherein the contact list comprises an entry comprising the telephone number, and wherein the plurality of prediction comprise probabilities that a corresponding key of the plurality of numerical keys is to be a next numerical key selected, and wherein the corresponding numerical key corresponds to a next digit in the telephone number, and
visually enhancing the dynamic keyboard based upon the plurality of prediction values, wherein visually enhancing the dynamic keyboard comprises altering an appearance of the dynamic keyboard based upon the plurality of prediction values and displaying a visually enhanced dynamic keyboard using the laser projection system, wherein altering the appearance of the dynamic keyboard comprises
shrinking a second numerical key of the plurality of numerical keys based upon a first corresponding prediction value, enlarging a third numerical key of the plurality of numerical keys based upon a second corresponding prediction value, changing a color of fourth numerical key of the plurality of numerical keys based upon a third corresponding prediction value, and changing a distance between the first numerical key and a fifth numerical key of the plurality of numerical keys based upon an inverse of a fourth corresponding prediction value.

18. The device in claim 17, wherein altering the appearance of the dynamic keyboard comprises resizing each of the plurality of numerical keys in proportion to the plurality of prediction values.

19. The device in claim 17, wherein altering the appearance of the dynamic keyboard comprises changing distances between each of the plurality of numerical keys and the numerical key associated with the input detected based upon the plurality of prediction values.

20. The device in claim 17, wherein altering the appearance of the dynamic keyboard comprises changing a color of each of the plurality of numerical keys based upon the plurality of prediction values.

* * * * *